United States Patent [19]

Lee

[11] Patent Number: 5,467,133
[45] Date of Patent: Nov. 14, 1995

[54] APPARATUS FOR COMPENSATING VIDEO MOTIONS IN DIGITAL TELEVISIONS

[75] Inventor: Dong H. Lee, Seoul, Rep. of Korea

[73] Assignee: Goldstar Co., Ltd., Seoul, Rep. of Korea

[21] Appl. No.: 347,945

[22] Filed: Dec. 1, 1994

Related U.S. Application Data

[63] Continuation of Ser. No. 63,133, May 17, 1993, abandoned.

[30] Foreign Application Priority Data

May 20, 1992 [KR] Rep. of Korea .................... 8559/1992

[51] Int. Cl.⁶ ........................................ H04N 7/12
[52] U.S. Cl. ................................ 348/402; 348/416
[58] Field of Search ........................... 358/136, 135, 358/133; 348/420, 402, 407, 416; H04N 7/12

[56] References Cited

U.S. PATENT DOCUMENTS

| | | | |
|---|---|---|---|
| 4,862,264 | 8/1989 | Wells et al. | 348/416 |
| 4,958,226 | 9/1990 | Haskell | 358/136 |
| 5,028,995 | 7/1991 | Izawa | 358/136 |
| 5,046,071 | 9/1991 | Tanoi | 348/402 |
| 5,113,255 | 5/1992 | Nagata | 358/136 |
| 5,117,287 | 5/1992 | Koike et al. | 348/402 |
| 5,130,797 | 7/1992 | Murakami | 358/136 |
| 5,134,475 | 7/1990 | Johnston | 358/136 |
| 5,144,426 | 9/1992 | Tanaka | 358/136 |
| 5,173,773 | 12/1992 | Ueda et al. | 348/407 |
| 5,212,549 | 5/1993 | Ng et al. | 358/136 |
| 5,227,877 | 7/1993 | Yukitake | 358/136 |
| 5,311,310 | 5/1994 | Jozawa et al. | 348/416 |
| 5,317,397 | 5/1994 | Odaka et al. | 348/416 |
| 5,337,086 | 8/1994 | Fujinami | 348/402 |

*Primary Examiner*—James J. Groody
*Assistant Examiner*—Chris Grant
*Attorney, Agent, or Firm*—Fliesler, Dubb, Meyer & Lovejoy

[57] ABSTRACT

An apparatus for compensating video motions in a digital TV, capable of encoding and decoding data at, a low clock frequency. The apparatus comprises a subtraction circuit, for generating an error signal indicative of the difference between video information of subframes of an input frame and video information of subframes of a previous frame motion-compensated, a signal coding circuit for transforming and quantizing the error signal to a finite number, a variable length encoding circuit for encoding the quantized error signal, a signal decoding circuit for dequantizing and inversely transforming the error signal from the signal coding circuit, an adding circuit for adding the error signal from the signal decoding circuit to the previously motion-compensated video information, a subframe storing circuit for storing the video information from the adding circuit, and a motion presumption/compensation circuit for detecting position data of moved pixels from the video information of the previous frame stored in the subframe storing circuit and the video information of the input frame, calculating positional vector amounts of the moved pixels from the detected position data, and compensating the video information of the previous frame by the calculated positional vector amounts.

2 Claims, 3 Drawing Sheets

APPARATUS FOR COMPENSATING VIDEO MOTIONS IN DIGITAL TELEVISIONS

This application is a continuation of U.S. application Ser. No. 08/063,133, filed May 17, 1993, now abandoned.

BACKGROUND OF THE INVENTION

1. Field of the Invention

The present invention relates to a video motion compensation for digital TVs, and more particularly to an apparatus for compensating video motions in digital TVs.

2. Description of the Prior Art

Generally, appliances such as digital TVs, high definition televisions (HDTVs) and moving pictures experts group (MPEG) devices are devices wherein analog video information is converted into a digital signal by a coding and the digital signal is decoded to display the video on a screen.

In cases of televisions adopting the NTSC system, analog video information is sampled at 13.5 MHz. For expressing one sampled digital video information by the unit of 8 bits, it is required to provide a bit rate of 13.5×8 Mbps. However, such a video signal of 13.5×8 Mbps should be compressed to 6×8 Mbps, since television receivers of the NTSC system currently used adopt a sampling frequency of 6 MHz.

Accordingly, in digital TVs, only video information involving motion, from 30 frames scanned per one second is transmitted. That is, pixels involving no motion in one frame are not transmitted and only position vector amount data for moved pixels is transmitted.

As video information Vi corresponding to one frame is inputted, it is converted into the frequency domain, by a discrete cosine transform (DCT) processing. Where one frame is constituted by the same video pixels, it is outputted as one video data. For various video information input, however, it is outputted as a plurality of video data.

A plurality of video data outputted after the DCT are then quantized to a finite number, by a quantization circuit. The quantized video information are encoded into different numbers of bits by a variable length encoder, depending on their generation rates, and then transmitted.

The transmitted video information are decoded into the original video information, according to an inverse quantization and an inverse discrete cosine transform (IDCT) processing achieved by a data decoding device, to be displayed on a screen.

Higher frequencies are required for achieving the above-mentioned encoding and decoding procedures in a real time processing manner.

In HDTVs, a considerably high clock frequency is required for achieving a real time processing, because of a high sampling rate of above 50 MHz. However, such a high frequency has not been realized by existing TTLs and chips of ECL level. Recently, there has been proposed a parallel subframe processing method of dividing video information of one frame into a plurality of subframes and performing encoding and decoding operations for video data of divided sub-frames.

FIG. 1 illustrates a conventional frame division method. As shown in FIG. 1, one frame is divided into a plurality of subframes F1 to FN.

Referring to FIG. 2, there is illustrated a conventional data encoding device. As shown in FIG. 2, the data encoding device comprises a demultiplexor 1 for receiving video information V1 of one frame and dividing it into a plurality of subframes F1 to FN. To the outputs of demultiplexor 1, an encoding circuit 2 is connected, which includes a plurality of encoders. The encoders of the encoding circuit 2 receive and encode video information DM1 to DMn of the subframes 1-N, to compress them, respectively. Compressed video information DE1 to DEn from the encoding circuit 2 are applied to a multiplexor 3 which, in turn, processes them to generate one video information Vo to be transmitted.

FIG. 3 illustrates subframes divided from one frame in accordance with the prior art. As shown in FIG. 3, each of subframes SF1, SF2 is divided into a plurality of basic blocks B to be encoded. Motion-involving pixels of each basic block B are searched and pixels surrounding them are also searched.

Where the basic block B being searched is positioned adjacent to the boundary of the subframe, as indicated by the area Ba in FIG. 3, it is necessary to search even the pixels of basic blocks of a subframe ("SF2" in the case of FIG. 3) positioned adjacent to the subframe ("SF1" in the case of FIG. 3) being searched. For achieving a presumption and a compensation of video motions, it is also necessary to store, in encoders, even subframe portions overlapping with video data of adjacent subframe.

FIG. 4 is a block diagram of a conventional video motion compensating apparatus. As shown in FIG. 4, the motion compensating apparatus comprises a subtraction circuit 10 for receiving video information DMi of subframes of an input frame and video information Hi of subframes of a just previous frame motion-compensated and detecting an error signal indicative of a difference between both the received video information DMi and Mi. To the subtraction circuit 10, a signal coding circuit 20 is connected to receive the error signal from the subtraction circuit 10. The signal coding circuit 20 includes a DCT 21 and a quantization circuit 22, so as to transform and quantize the received error signal to a finite number. The motion compensating apparatus also comprises a variable length encoding circuit 30 connected to the signal coding circuit 20 and adapted to variable length-encode the quantized error signal Qi from the signal coding circuit 20, depending on its generation rate. To the signal coding circuit 20, a signal decoding circuit 40 is also connected, which includes an inverse quantization circuit 41 and an inverse discrete cosine transform circuit IDCT 42. The signal decoding circuit 40 is adapted to receive the error signal Qi from the signal coding circuit 20 and decode it into original error information DQi, through the inverse quantization circuit 41 and the IDCT 42. An adding circuit 50 is connected to the signal decoding circuit 40 and adapted to add the error signal DQi to the video information Mi of the subframes of motion-compensated previous frame which is also received therein. To the adding circuit 50, a subframe storing circuit 60 is connected for storing video information Si outputted from the adding circuit 50. The subframe storing circuit 60 is also adapted to store video information Ii of subframe portions overlapping with surrounding subframes. The motion compensating apparatus also comprises a motion presumption/compensation circuit 70 connected to the subframe storing circuit 60. The motion presumption/compensation circuit 70 is adapted to search positions of moved pixels from video data of the previous frame stored in the subframe storing circuit 60 and the video information of the input frame, calculate positional vector amounts of the moved pixels from data indicative of the searched pixel positions, and compensate the video information of the previous frame by the calculated positional vector amounts. To the subframe storing circuit 60, an interface circuit 80 is connected to send, to the subframe storing circuit 60, video information of basic blocks positioned at each boundary of adjacent subframes.

In the conventional motion compensating apparatus with the above-mentioned construction, the subframe storing circuit 60 receives the video information from the interface circuit 80 and the video information of the subframes of the previous frame. These video data from the subframe storing circuit 60 are sent to the motion presumption/compensation circuit 70, together with the video information of the subframes of the current input frame.

Based on the received video information of the previous and current frames, the motion presumption/compensation circuit 70 searches the positions of moved pixels by basic blocks to detect position data thereof. It also calculates the motion vector amounts of the moved pixels, based on the position data of the detected pixels. The video information of the previous frame are compensated by the calculated motion vector amounts, respectively. Thus, the motion presumption/compensation circuit 70 outputs the compensated video information Mi of the previous frame.

The video information Mi outputted from the motion presumption/compensation circuit 70 is applied to the subtraction circuit 10 which, in turn, generates a difference signal indicative of a difference between the video information Mi and the video information DMi of the current input frame. That is, the subtraction circuit 10 outputs an error signal occurring from the compensated video information.

The error signal outputted from the subtraction circuit 10 is applied to the signal coding circuit 20 in which it is transformed and quantized to a finite number. The modulated error signal is then sent to the variable length encoding circuit 30, so that it has a varied number of bits, depending on its generation rate. The variable length encoding circuit 30 sends the varied error signal to a multiplexor not shown.

On the other hand, the error signal coded in the signal coding circuit 20 is also applied to the signal decoding circuit 40 in which it is converted into the original error signal. The decoded error signal is then sent to the adding circuit 50.

The adding circuit 50 adds the error signal to the motion-compensated video information Mi of the previous frame received from the motion presumption/compensation circuit 70 so that it outputs video information perfectly motion-compensated.

The video information from the adding circuit 50 is sent to the subframe storing circuit 60 and stored again as new reference video information.

Assuming that video information of one frame is divided into N number of subframes to be processed and that the subframes have the same signal amount, a clock frequency for operating each subframe can be reduced to 1/N. That is, the frame division can be achieved without any overlap between adjacent subframes. For individual subframes, simultaneous data coding and decoding can be achieved.

Where the motion presumption and compensation are performed by blocks, all the conventional motion compensating devices mentioned above are required to make blocks positioned at the boundary between adjacent subframes be commonly included in both the adjacent subframes. Video information of the overlapping subframe portions should be also stored. Also, values of signals corresponding to the overlapping subframe portions should be read through the interface circuit, every time when a processing for one frame is completed. As a result, the time taken for the motion compensation is lengthened. Also, there is a difficulty in realizing a simple circuit.

SUMMARY OF THE INVENTION

Therefore, an object of the invention is to provide an apparatus for compensating video motions in a digital TV, capable of reducing the time required to code and decode input video information and having a simple construction.

In accordance with the present invention, this object can be accomplished by providing an apparatus for compensating video motions in a digital television, comprising: subtraction means for generating a difference signal indicative of a difference between video information of subframes of an input frame and reference video information corresponding to video information of subframes of a previous frame motion-compensated; signal coding means for receiving said difference signal from said subtraction means and transforming and quantizing the received difference signal to a finite number; variable length encoding means for encoding the quantized difference signal outputted from said signal coding means to a number of bits varied depending on its generation rate; signal decoding means for decoding the coded difference signal outputted from the signal coding means into the original difference signal; adding means for adding said signal outputted from said signal decoding means to said reference video information; subframe storing means for storing said video information of the subframes of the previous frame not motion-compensated therein, said subframe storing means also receiving an output signal from said adding means, to store it as video information of subframes of a frame to be motion-compensated and then used as a reference video information for a next input frame; and motion presumption/compensation means for detecting position data of moved pixels from the video information of the previous frame stored in said subframe storing means and said video information of the input frame, calculating positional vector amounts of said moved pixels from said detected position data, and compensating the video information of the previous frame by said calculated positional vector amounts.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
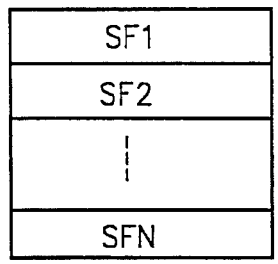
FIG. 1 is a schematic view illustrating a division of one frame into subframes.
Figure 2:
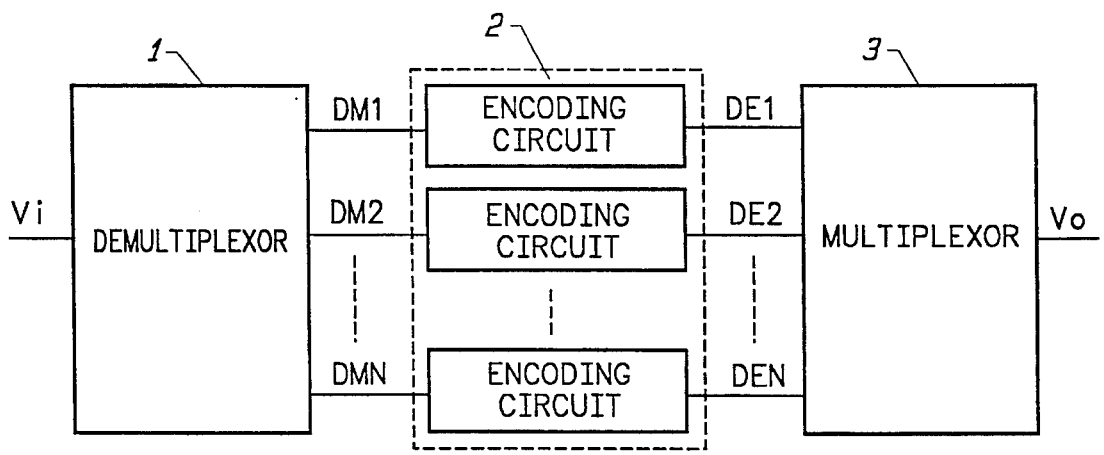
FIG. 2 is a block diagram of a conventional data coding device.
Figure 3:
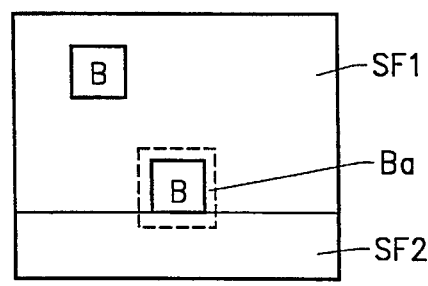
FIG. 3 is a schematic view illustrating motion presumption and compensation for subframes carried out by using the device of FIG. 2.
Figure 4:
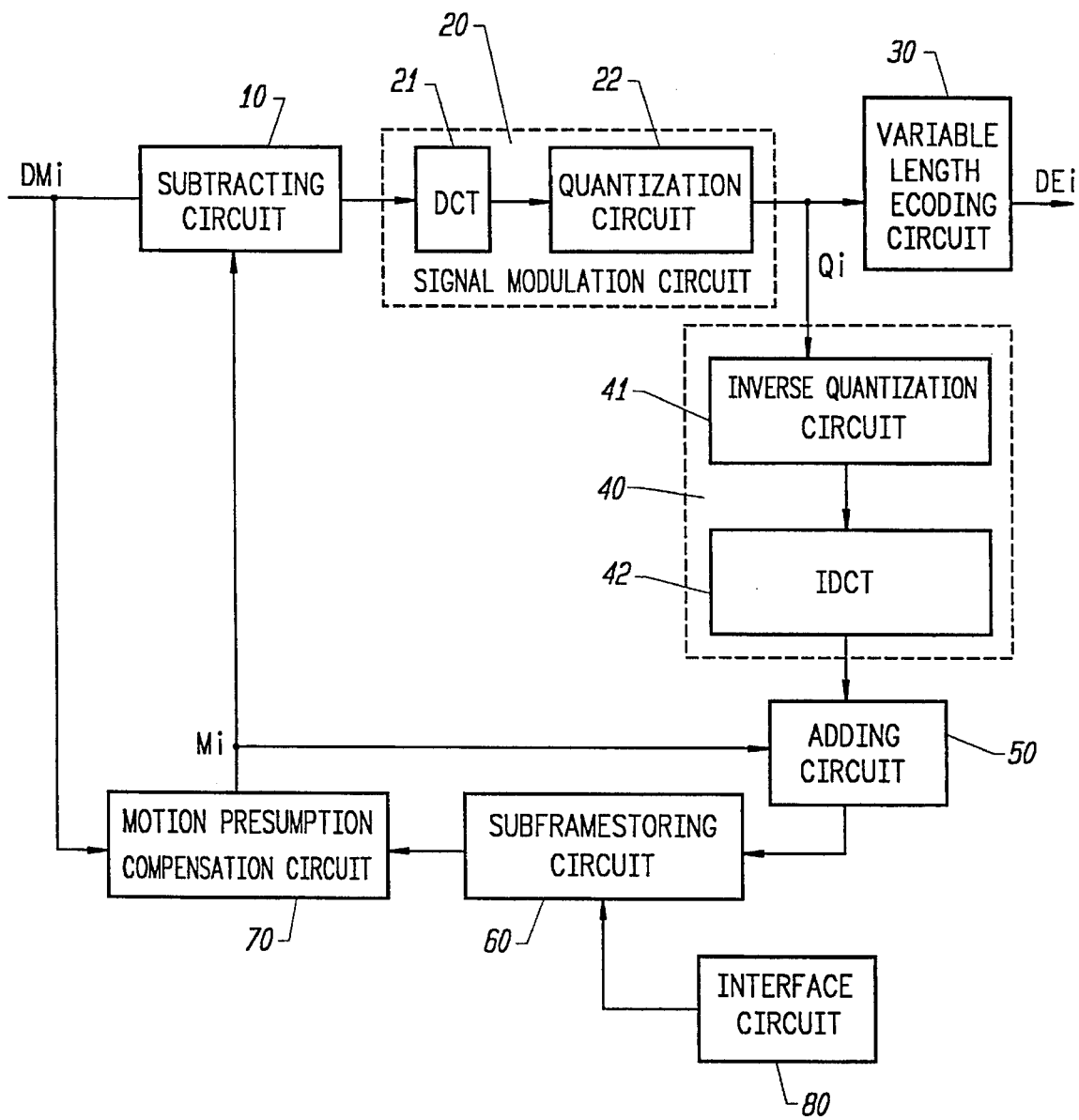
FIG. 4 is a block diagram of a conventional motion compensating device.
Figure 5:
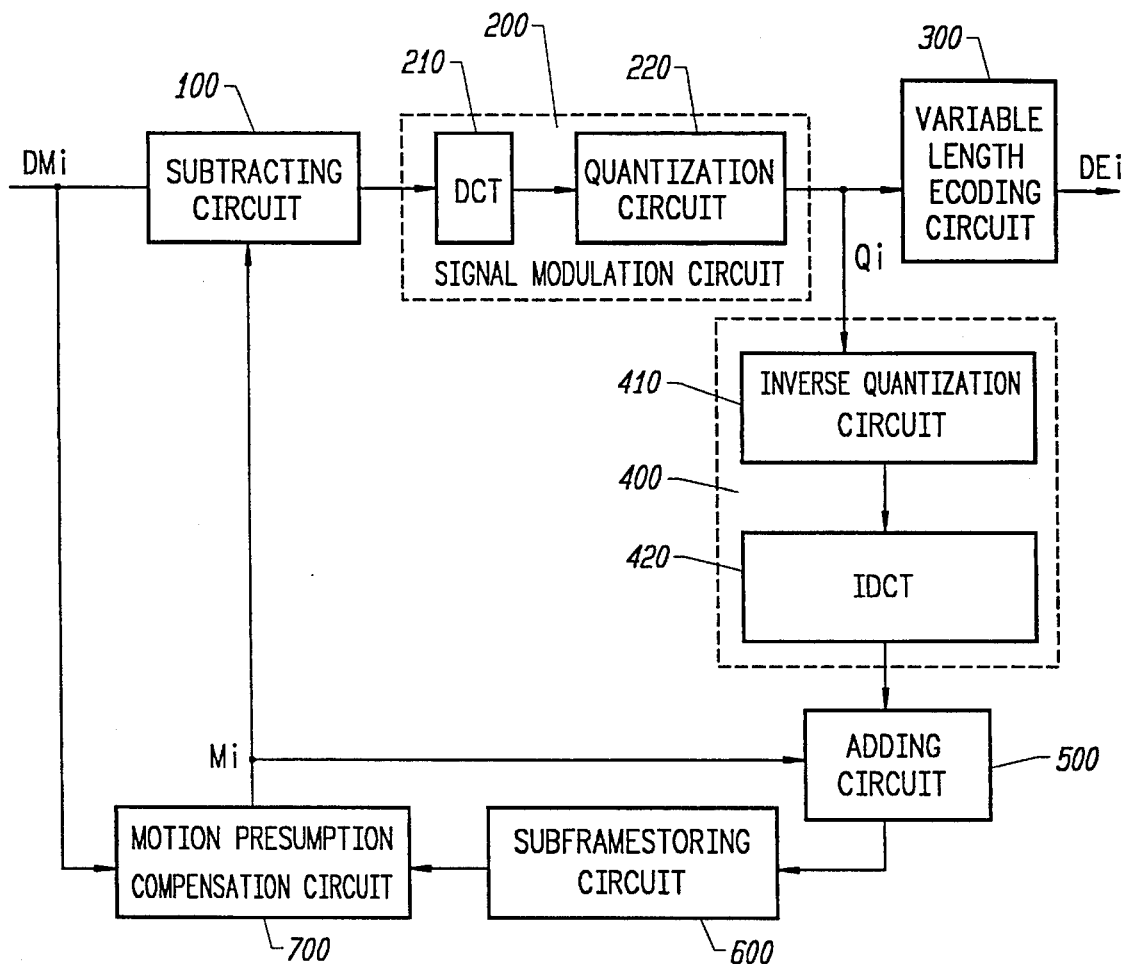
FIG. 5 is a block diagram of a motion compensating apparatus in accordance with the present invention.

Referring to FIG. 5, there is illustrated an apparatus for compensating video motions in a digital TV in accordance with the present invention.

As shown in FIG. 5, the motion compensating apparatus includes a subtraction circuit 100 for receiving video information DMi of subframes of an input frame at a time t and video information Mi of subframes of a just previous frame received at time t-1 just prior to time t and moved pixel position-compensated and detecting error information indicative of a difference between both the received video information DMi and Mi.

To the subtraction circuit 100, a signal coding circuit 200 is connected to receive the error signal from the subtraction circuit 100. The signal coding circuit 200 includes a DCT 210 and a quantization circuit 220, so as to transform and quantize the received error signal to a finite number.

The motion compensating apparatus also comprises a variable length encoding circuit 300 connected to the signal coding circuit 200 and adapted to encode the quantized error signal Qi from the signal coding circuit 200 to a number of bits varied depending on its generation rate.

To the signal coding circuit 200, a signal decoding circuit 400 is also connected, which includes an inverse quantization circuit 410 and an IDCT 420. The signal decoding circuit 400 is adapted to receive the error signal Qi from the signal coding circuit 200 and decode it into the original error signal, through the inverse quantization circuit 410 and the IDCT 420.

An adding circuit 500 is connected to the signal decoding circuit 400 and adapted to add the error signal DQi of the signal decoding circuit 400 to the video information Mi of the subframes of the motion-compensated previous (t-1) frame which is also received therein.

To the adding circuit 500, a subframe storing circuit 600 is connected, which is adapted to store video data inputted at the time t-1. The motion compensating apparatus also comprises a motion presumption/compensation circuit 700 connected to the subframe storing circuit 600. The motion presumption/compensation circuit 700 is adapted to detect position data of moved pixels from video information of the previous (t-1) frame stored in the subframe storing circuit 600 and the video information of the current (t) input frame, calculate positional vector amounts of the moved pixels from the detected position data, and compensate the video information of the previous frame by the calculated positional vector amounts.

Figure 6:
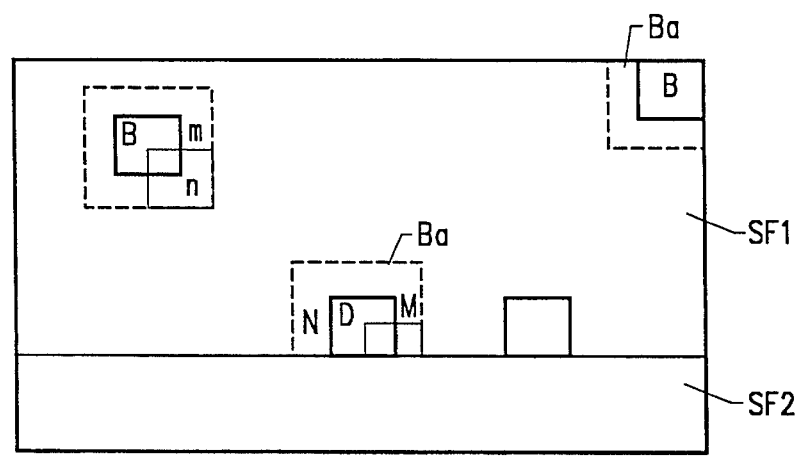
FIG. 6 is a schematic view illustrating position search regions B and search-limited regions Ba of unit blocks for detecting positions of moved pixels.

FIG. 6 is a schematic view illustrating position search regions B and search-limited regions Ba of unit blocks for detecting positions of moved pixels.

Operation of the motion compensating apparatus with the above-mentioned construction will now be described, in conjunction with FIGS. 5 and 6.

First, video information of one frame is divided into a plurality of subframes. Video information DMi of these subframes are applied to the motion presumption/compensation circuit 700 in which video information of a previous frame has been received at time t-1 just prior to current time t.

The motion presumption/compensation circuit 700 traces positions of moved pixels by blocks, based on the received video information of the current and previous frames, to detect the positions of moved pixels. Based on the detected position data, it compensates the video information of stored previous (t-1) frame and thus outputs the resultant compensated video information Mi.

That is, the motion presumption is achieved by detecting positions of moved pixels by the unit of a block including 16×16 pixels, as shown in FIG. 6, and searching blocks surrounding the currently detected block. Also, a search is made for blocks positioned at the boundary of the subframe. At this time, no search is made for surrounding blocks positioned beyond the boundary of the subframe.

The motion-compensated video information Mi outputted from the motion presumption/compensation circuit 700 is applied to the subtraction circuit 100 so that a difference component between the video information Mi and the current input video information DMi can be derived.

That is, the subtraction circuit 100 outputs an error signal indicative of the difference component between the input video information DMi and the compensated video information Mi. This error information is used for compensating the video information of the subframes of the previous frame.

The error signal is applied to the DCT 210 of the signal modulation circuit 200 which, in turn, converts it into the frequency domain. The converted error information is then applied to the quantization circuit 220 of the signal modulation circuit 200. In the quantization circuit 220, the error information is quantized to a finite number of bits.

The modulated error signal from the signal modulation circuit 200 is then sent to the variable length encoding circuit 300, so that it is subjected to a variable length coding. The variable length encoding circuit 300 sends the variable length-encoded error signal to a multiplexor not shown.

The error signal modulated in the signal modulation circuit 200 is also applied to the signal demodulation circuit 400 in which it is demodulated into the original error signal. The demodulated error signal is then sent to the adding circuit 500.

In the adding circuit 500, the error signal is added to the motion-compensated video information Mi of the previous frame outputted from the motion presumption/compensation circuit 700. As a result, the adding circuit 500 outputs video information Si perfectly compensated as the current input video information.

The video information Si from the adding circuit 500 is sent to the subframe storing circuit 600 and stored again.

As video information of subframes of a next frame is inputted, the above-mentioned procedures are repeated to generate an error signal.

As apparent from the above description, the present invention provides a motion compensating apparatus requiring no search for surrounding blocks positioned adjacent to the boundary between adjacent subframes, differently from the prior art. The subframe storing circuit stores only video information of subframes. Accordingly, it is possible to achieve the data encoding operation and the data decoding operation, independently from each other. Such independent data encoding and decoding operations make it possible to eliminate a separate interface circuit. As a result, the motion presumption and compensation can be achieved by a simple hardware.

Although the preferred embodiments of the invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for encoding of motion video for digital television, comprising:

subtracting means for generating a difference signal indicative of a difference between video information of a current subframe of a digital television signal input at a time t and reference video information of a corresponding previous subframe of the digital television signal input at a time t-1 and having been motion-compensated, the current subframe and the corresponding previous subframe each being one of a plurality of adjacent subframes comprising respectively a current frame and a previous frame of the digital television signal;

transforming means for transforming the difference signal generated by the subtraction means into a frequency domain signal;

quantizing means for quantizing the frequency domain signal from the transforming means to generate a quantized difference signal of a finite number;

variable length encoding means for encoding the quantized difference signal from the quantizing means into an encoded output signal having a variable number of bits according to a generation rate of the quantized difference signal;

de-quantizing means for de-quantizing the quantized difference signal from the quantizing means;

inverse transforming means for inversely transforming the de-quantized difference signal from the de-quantizing means into a signal in the spatial domain for generating a restored difference signal;

adding means for adding the restored difference signal from the inverse transforming means and the reference video information of the corresponding previous subframe;

subframe storing means for storing video information of the corresponding previous subframe output from the adding means; and motion presumption/compensation means for: 1) detecting position data of moved pixels between the video information of the corresponding previous subframe stored in the subframe storing means and the video information of the current subframe, 2) calculating positional vector amounts of the moved pixels from the detected position data, and 3) motion-compensating the video information of the corresponding previous subframe in accordance with the calculated positional vector amounts to thereby form said reference video information;

wherein said detecting of position data of moved pixels is accomplished by:
  detecting positions of unit blocks of pixels of the video information within a subframe,
  detecting positions of moved pixels of the video information by search blocks of pixels surrounding the unit blocks for those of the unit blocks not positioned at a boundary of the subframe, and
  detecting positions of moved pixels of the video information by limited search blocks of pixels surrounding the unit blocks for those of the unit blocks positioned at a boundary of the subframe, the limited search blocks being smaller in size than the search blocks such that the limited search blocks do not exceed the subframe boundary.

2. In a method for encoding of motion video for digital television by and apparatus including a subtracting means for generating a difference signal indicative of a difference in the spatial domain between respective video informations of a digital television signal input thereto, a transforming means for transforming the difference signal generated by the subtraction means into a frequency domain signal, a quantizing means for quantizing the transformed difference signal from the transforming means to generate a quantized difference signal of a finite number, a variable length encoding means for encoding the quantized difference signal from the quantizing means into an encoded output signal having a variable number of bits according to a generation rate of the quantized difference signal, a de-quantizing means for de-quantizing the quantized difference signal from the quantizing means, an inverse transforming means for inversely transforming the de-quantized difference signal from the de-quantizing means into a signal in the spatial domain for generating a restored difference signal, an adding means, a subframe storing means for storing video information and a motion presumption/compensation means for detecting position data of moved pixels between respective video informations, calculating positional vector amounts of the moved pixels from the detected position data and motion-compensating the video information in accordance with the calculated positional vector amounts, the method of operation comprising:

a) generating a difference signal indicative of a difference between video information of a current subframe of a digital television signal input at a time t, and a reference video information of a corresponding previous subframe of the digital television signal input at a time t-1 and having been motion-compensated, the current subframe and the corresponding previous subframe each being one of a plurality of adjacent subframes comprising respectively a current frame and a previous frame of the digital television signal;

b) transforming the difference signal generated by the subtraction means into a frequency domain signal;

c) quantizing the frequency domain signal from the transforming means to generate a quantized difference signal of a finite number;

d) encoding the quantized difference signal from the quantizing means into an encoded output signal having a variable number of bits according to a generation rate of the quantized difference signal;

e) de-quantizing the quantized difference signal from the quantizing means;

f) inversely transforming the de-quantized difference signal from the dequantizing means into a signal in the spatial domain for generating a restored difference signal;

g) adding the restored difference signal from the inverse transforming means and the reference video information of the corresponding previous subframe;

h) storing video information of the corresponding previous subframe output from the adding means; and i) detecting position data of moved pixels between the video information of the corresponding previous subframe stored in the subframe storing means and the video information of the current subframe by:
  detecting positions of unit blocks of m × n pixels in size of the video information within a subframe;
  detecting positions of moved pixels of the video information by search blocks surrounding the unit blocks for those of the unit blocks not positioned at a boundary of the subframe, and
  detecting positions of moved pixels of the video information by limited search blocks for those of the unit blocks positioned at a boundary of the subframe, the limited search blocks surrounding the unit blocks and being smaller in size than the search blocks such that the limited search blocks do not exceed the subframe boundary;

j) calculating positional vector amounts of the moved pixels from the detected position data; and k) motion-compensating the video information of the corresponding previous subframe in accordance with the calculated positional vector amounts to thereby form said reference video information.

\* \* \* \* \*